United States Patent [19]
McCombie

[11] 3,759,390
[45] Sept. 18, 1973

[54] THE REMOVAL OF SURFACE LAYERS FROM LIQUIDS

[75] Inventor: Frederick Walter McCombie, London, England

[73] Assignee: Megator Pumps and Compressors Limited, London, England

[22] Filed: Feb. 10, 1971

[21] Appl. No.: 114,157

[30] Foreign Application Priority Data
Mar. 5, 1970 Great Britain .................. 10,540/70
Aug. 26, 1970 Great Britain .................. 41,089/70

[52] U.S. Cl. .......................... 210/242, 210/DIG. 21
[51] Int. Cl. ........................................... E02b 15/04
[58] Field of Search ............. 210/169, 242, DIG. 21

[56] References Cited
UNITED STATES PATENTS
1,644,248  10/1927  Goldman ........................... 210/242
2,608,300  8/1952  Small ............................. 210/DIG. 21
3,642,140  2/1972  Parker ............................. 210/242
1,107,391  8/1914  Welch .............................. 210/242

FOREIGN PATENTS OR APPLICATIONS
804,368  11/1958  Great Britain ..................... 210/242

OTHER PUBLICATIONS
Auslegeschrift 1,064,367, Veld, Aug. 27, 1959.

Primary Examiner—Samih N. Zaharna
Assistant Examiner—T. A. Granger
Attorney—Arthur B. Colvin

[57] ABSTRACT

A device for pumping away floating oil slicks comprises a floating inlet chamber. Oil is drawn through an upper wall of the chamber and is pumped upwardly from the lower part of the chamber. Two embodiments are described one of which includes an outlet part connected to the chamber by parts which can straddle a boom confining the oil and the other of which includes a circular chamber supported by a long dependent pipe.

3 Claims, 4 Drawing Figures

FREDERICK WALTER McCOMBIE
INVENTOR

BY Arthur B. Colvin
ATTORNEY

THE REMOVAL OF SURFACE LAYERS FROM LIQUIDS

The invention relates to the removal of surface layers from liquids and is particularly concerned with the removal of slicks of oil or similar undesirable material floating on water.

It is an object of the present invention to provide apparatus which can remove the surface layer unaccompanied by, or accompanied by a very small amount of, the liquid on which the surface layer floats.

According to the present invention there is provided an apparatus for removing a surface layer from a liquid, such apparatus comprising a chamber capable of floating in the liquid, inlet means at an upper surface of the chamber through which the surface layer can enter the interior of the chamber and outlet means through which liquid can be drawn upwardly from the lower part of the chamber to a source of suction.

The phrase "capable of floating" means that the chamber is inherently buoyant or is rendered buoyant by an additional element or elements.

The invention will now be described by way of example and with reference to the accompanying drawings, wherein.

Figure 1:
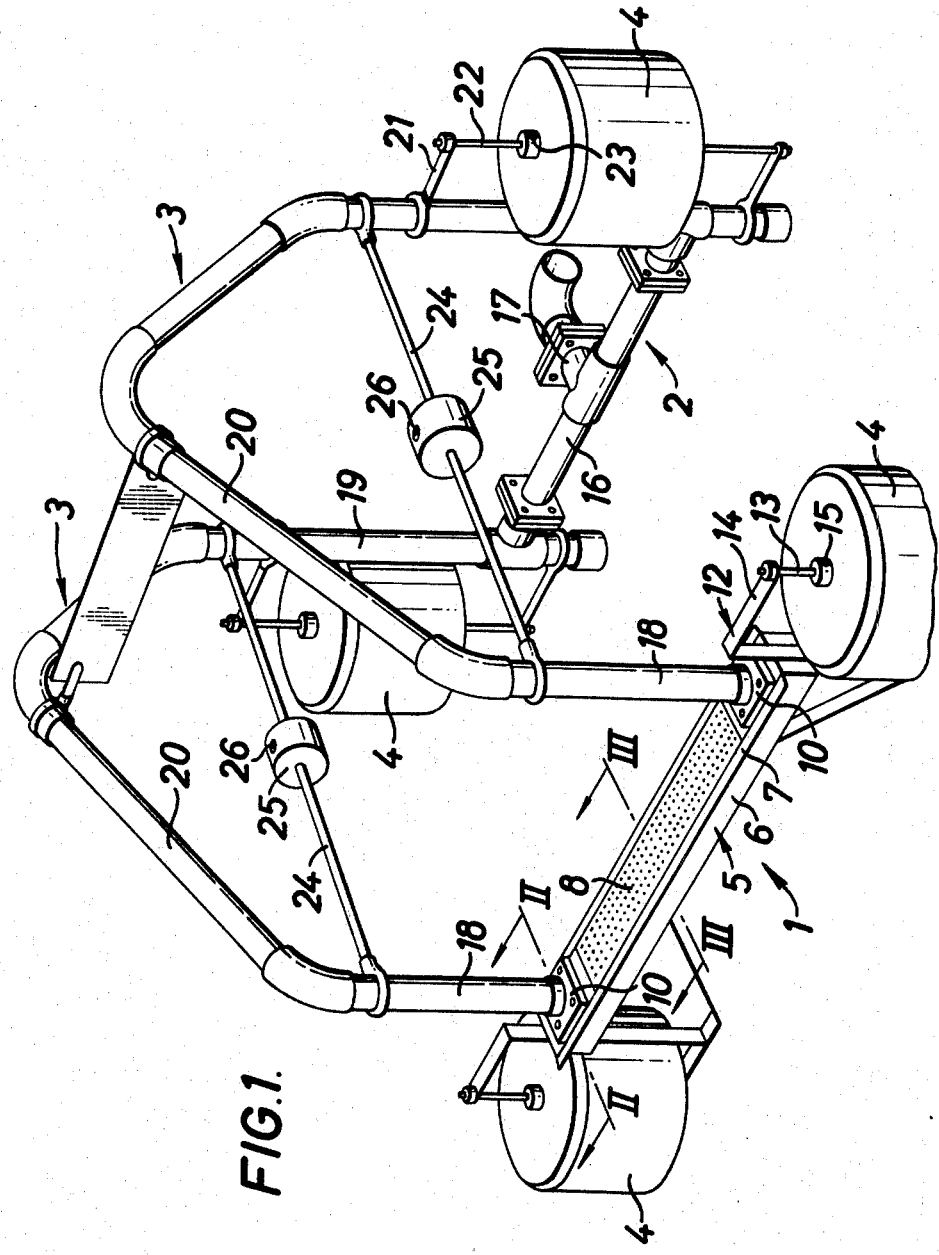
FIG. 1 is a perspective view of an apparatus in accordance with a first embodiment of the invention.

The apparatus shown in FIG. 1 of the drawings comprises front and rear laterally extending elongate parts 1 and 2 respectively. The parts 1 and 2 are of equal length and disposed the one behind the other in parallel relationship. Two identical bridging assemblies 3, parallel when viewed in plan, extend longitudinally to connect the parts 1 and 2 so that the apparatus is generally rectangular when viewed in plan. Cylindrical floats 4 are provided at the corners of the apparatus. A typical apparatus measures 1½ metres by 1 metre.

Figure 2:
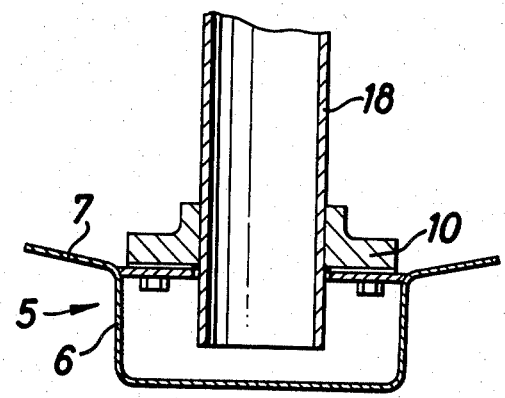
FIG. 2 is a section on the line 11—11 of FIG. 1.
Figure 3:
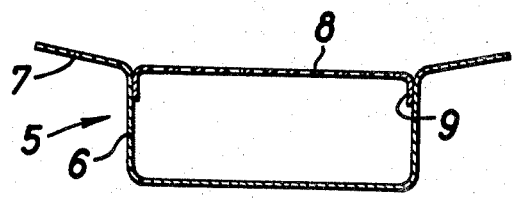
FIG. 3 is a section on the line 111—111 of FIG. 1.

The front elongate part 1, hereinafter referred to as the inlet part, comprises an elongate chamber 5 of generally rectangular cross-section. As can well be seen in FIG. 3 of the drawings the chamber 5 comprises a body 6 of rectangular channel section having the upper end parts of the flanges outwardly and upwardly inclined to provide elongate strips constituting splitter weirs 7. A removable lid for the chamber 5 is constituted by an elongate rectangular perforated strainer plate 8 having the longitudinal edge parts 9 downturned to fit the body. The strainer plate 8 prevents solid matter from entering the interior of the chamber 5. Referring now to FIG. 2 of the drawings showing an end part of the chamber 5, a mounting plate 10 is fixed to the upper wall of the chamber and supports a dependent suction pipe 18, forming part of the bridging assembly 3. The lower end part of the pipe 18, which forms the liquid inlet, is positioned adjacent the lower wall of the chamber 5. A channel shaped bracket 12 is fastened by its web to each end surface of the chamber 5 and a vertical spindle 13 extends between the outwardly projecting flanges 14 of the bracket 12. A float 4 is slidably received on each spindle 13 and is settable to the required vertical position by a grub screw 15.

The rear part 2 hereinafter referred to as the outlet part, comprises a generally cylindrical transverse tubular element 16 having a centrally disposed rearwardly extending spigot, manifold or elbow 17 for connection to a suction hose leading to an appropriate pump. A connecting and bridging pipe assembly 3 extends from each end of the element 16 to the corresponding part of the chamber 5. Each pipe assembly comprises front and rear vertical parts 18 and 19 and an intermediate part 20 of inverted V form. Struts 21 extend laterally outwardly from the rear vertical part 19 and a spindle 22 extends vertically between the outer ends of the struts 21. A cylindrical float 4 is slidably received on each spindle 22 and is settable by a grub screw 23. A horizontal rail 24 extends between the upper parts of the vertical parts 18 and 19 of each pipe assembly 3. A weight 25 is slidable in the rail to adjust the trim of the apparatus and is settable by a grub screw 26.

The use of the apparatus to remove an oil slick floating on water and contained by a boom will now be described by way of example. The operator can manipulate the apparatus by grasping the pipe assemblies while standing on the clean side of the boom. The inlet part 1 floats in the water carrying the slick and the outlet part 2 floats in clean water the pipe assemblies 3 bridging the boom. The buoyancy and trim of the apparatus are so contrived, if necessary by adjustment of the floats 4 and the weights 25, that, in the normal floating position with the pipes or the assemblies 3, which define balancing chambers, empty, the weirs 7 are just clear of the surface of the slick. The inlet part 1 is then slightly depressed so that oil is drawn over the weirs 7 through the strainer plate 8 into the interior of the chamber 5. The liquid can be observed flowing over the weir and to assist this observation the weir is advantageously constructed from stainless steel or other bright material. Oil in the chamber is pumped through the pipes 18 to the element 16 and away through the suction hose. The extension of the pipes 18 into the lower part of the chamber 5 is advantageous for the following reasons:

The pump has an approximately uniform displacement of either liquid or air and this is set at a rate at which the oil can come over the weirs 7 with an operating head approximately equal to the thickness of the oil layer. If, due to ripples or other disturbance for example, the amount coming over the weir is less than the pump capacity, the lower ends of the pipe remain submerged in liquid. The level of the liquid in the chamber 5 in these circumstances goes down but normally the necessary amount of liquid again comes over the weirs before air is drawn into the pipes. In operation with the pipes of the assemblies 3 full of liquid the buoyancy of the apparatus is such that the weight of liquid causes the inlet part 1 to be maintained in the correct position with the weirs 7 just below the surface of the liquid in the slick. The inverted V-shape of the intermediate parts 20 assists the correct trim of the apparatus as they tend to be either full of liquid or full of air. A horizontal cross-piece would have an indeterminate amount of liquid going along its lower portion while the upper portion would contain air.

When all the oil has been removed the inlet part 1 is raised so that air is drawn in and the pipes are emptied of liquid. The chamber then floats with the weirs 7 above the liquid surface and pumping of liquid ceases until the inlet part is again depressed. Variations in the submergence of the outlet part 2 such as might result from the pull of the hose will merely cause the elongate and narrow chamber 5 to turn slightly in a plane perpendicular to its length and will have little effect on the submergence of the weirs. The generally square configuration of the apparatus with floats 4 at each corner gives maximum resistance to any twisting effect resulting from the weight or pull of the hose. In another embodiment envisaged the apparatus is in the form of a regular trapezium, the parts 1 and 2 being parallel but the outlet part 2 being longer than the inlet part 1. The pipe assemblies 3 are forwardly convergent. The chamber 5 is in a central position so that any twisting of the apparatus causes only small variations in the submergence of the weirs 7.

Figure 4:
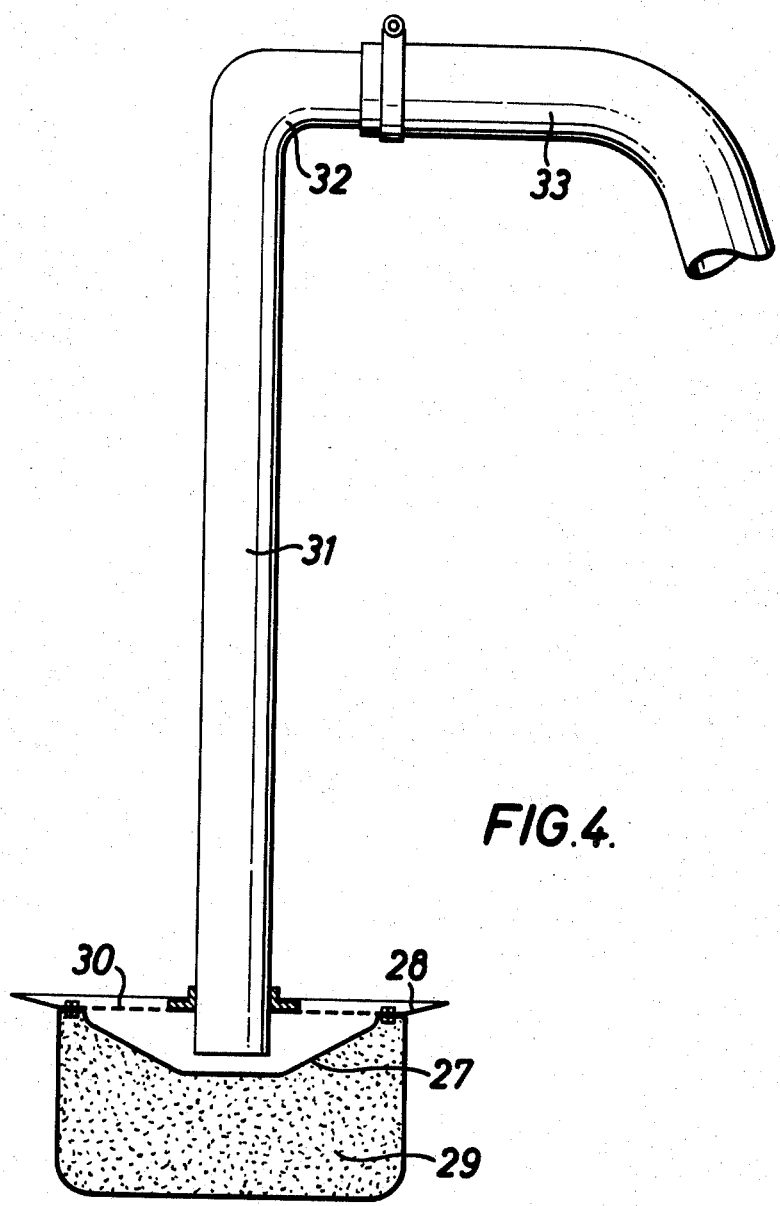
FIG. 4 is a side view partly in section of an apparatus in accordance with a second embodiment of the invention.

Referring now to FIG. 4 of the drawings the second embodiment of the invention shown therein is circular when viewed in plan. An inlet chamber 27 is of shallow dished shape incorporating a rim 28 constituting a splitter weir. A generally cylindrical float 29, formed for example for filling the lower part of the chamber with closed-cell plastics foam, supports the chamber 27. A disc shaped strainer 30 covers the chamber 27. A suction pipe 31, defining a balancing chamber, extends from a position adjacent the base of the chamber 27 and has an elbow 32 at the upper part thereof connected to a suction hose 33. The suction pipe and elbow 32 provide a handle for the apparatus. The apparatus again floats so that the weir 28 is above or below the surface of the liquid according to whether the pipe is full of air or liquid.

I claim:

1. An apparatus for removing a surface layer from a liquid, such apparatus comprising a chamber capable of floating in the liquid, inlet means at an upper surface of the chamber through which the surface layer can enter the interior of the chamber, structure on the inlet means defining a peripheral edge of the chamber over which the surface layer flows into the chamber, outlet means defining a balancing chamber, through which liquid can be drawn upwardly from the lower part of the chamber to a source of suction, said outlet means comprising at least one pipe leading upwardly from the inlet chamber and then downwardly substantially in the form of an inverted V of sufficient width to straddle any boom or interceptor employed to contain the oil, the downward ends being connected to a floating manifold or elbow from which a hose connects to the source of suction, and flotation means such that the apparatus floats with the inlet means to the chamber above the surface of the liquid when the outlet means contain little or no liquid and below the surface when the outlet means are substantially filled with liquid.

2. An apparatus as claimed in claim 1 in which the chamber is of narrow rectangular shape with the long sides forming the entry edges perpendicular to the plane of the inverted - V suction pipes, so that any tilting of the apparatus resulting from variations in the submergence of the manifold or elbow due to the drag of a suction hose or to varying quantities of liquid in the manifold and hose have a minimal effect on the submergence and trim of the chamber.

3. An apparatus as claimed in claim 1, in which the front and rear portions of the V shaped pipe is connected by a horizontal member carrying a sliding weight by means of which the submergence and trim of the chamber can be adjusted.

* * * * *